Jan. 30, 1962    W. P. OEHLER ETAL    3,019,032
CONNECTION FACILITATING DRAFT CONNECTION
Original Filed Oct. 31, 1957

INVENTORS
WILLIAM P. OEHLER
HAROLD V. HANSEN
BY
Roger E. Johnson
ATTORNEY

United States Patent Office 3,019,032
Patented Jan. 30, 1962

3,019,032
CONNECTION FACILITATING DRAFT
CONNECTION
William P. Oehler and Harold V. Hansen, Moline, Ill., assignors to Deere & Company, a corporation of Delaware
Original application Oct. 31, 1957, Ser. No. 693,710. Divided and this application July 25, 1960, Ser. No. 44,933
4 Claims. (Cl. 280—478)

This application is a division of our co-pending application, Ser. No. 693,710, now Patent No. 2,979,136, filed October 31, 1957 for Planters.

The present invention relates generally to agricultural implements and more particularly to implements such as corn planters and the like.

The object and general nature of this invention is the provision of new and improved hitch means for connecting an agricultural implement, such as a planter, for example, to the drawbar of a tractor.

More specifically, it is a feature of this invention to provide hitch means especially adapted to accommodate some misalignment between the tractor and implement when connecting the latter to the tractor.

These and other objects and advantages of the present invention will be apparent to those skilled in the art after a consideration of the following detailed description, taken in conjunction with the accompanying drawings, in which.

Figure 1:
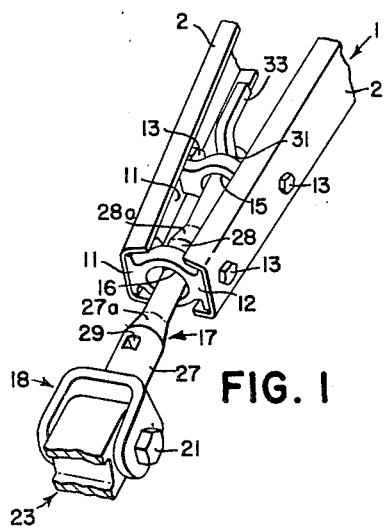
FIG. 1 is a fragmentary perspective view of a releasable tractor-implement hitch, showing the hitch in its loosened or connection-facilitating position.

Referring first to FIG. 1, the present invention has been shown by way of illustration as incorporated in an agricultural implement, such as a planter, having a forward draft frame 1 that is made up of forwardly converging plate sections 2, generally in the form of channels, the rear portions of which are rigidly fixed to the frame of the implement. The front end of the hitch frame 1 is adapted to be connected, as by means embodying the principles of the present invention, to a conventional farm tractor, which is represented by the rearwardly extending tractor drawbar 4, the rear end of which is apertured to receive a draft pin or the like. The new and improved hitch means that we provide for connecting the front end of the draft frame 1 with the tractor drawbar 4 includes means whereby it is not necessary, for convenient and easy connection, to have the tractor precisely aligned with the implement. That is, there may be some misalignment between the front portion of the implement hitch frame 1 and the tractor drawbar 4, yet by virtue of this invention the implement may readily be hitched to the tractor drawbar in such a way that, after the preliminary connection is made, the tractor may be backed toward the implement to complete the connection whereby certain of the hitch parts may be rigidly interconnected with the draft frame by virtue of the backing of the tractor relative to the implement.

Figure 2:
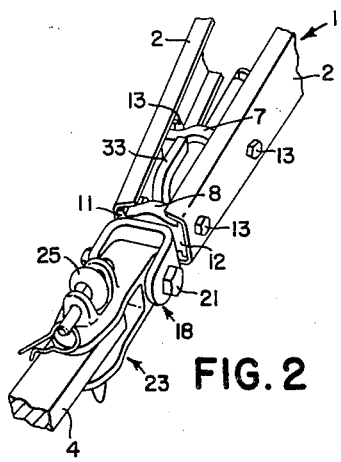
FIG. 2 is a view similar to FIG. 1, showing the hitch in its rigidly-connected position.

Referring now to the drawings, the front or outer ends of the main hitch bars or plate sections 2 are interconnected by apertured cross pieces 7 and 8 that are fixed in any suitable way to the front portions of the channels 2 in rigid relation. Preferably, the cross pieces 7 and 8 are rigidly connected with short bars 11 and 12 that are bolted, as at 13, to the webs of the channel members 2, as best shown in FIGS. 1 and 2.

Figure 3:
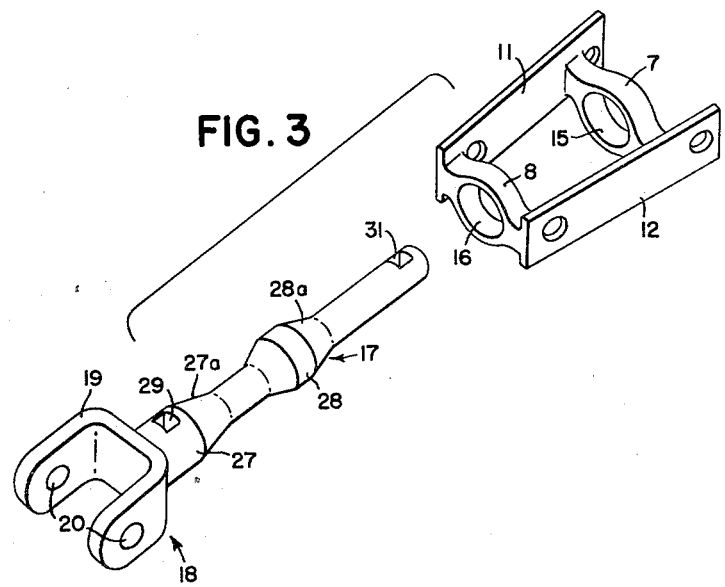
FIG. 3 is a perspective view of the telescoping hitch clevis member, with associated part.

The apertures 15 and 16 (FIG. 3) in the cross pieces 7 and 8 are adapted to receive the shank portion 17 of hitch clevis unit 18, the latter being shown in detail in FIG. 3. The hitch clevis unit, indicated in its entirety by the reference numeral 18, includes a U-shaped clevis 19 fixed to the outer end of the shank portion 17 and apertured at 20 to receive a pin or bolt 21 by which a generally vertically swingable clevis member 23 is connected with the hitch clevis unit 18. The clevis 23 carries a hitch pin 25 that is adapted to detachably connect the hitch clevis unit 18 to the drawbar 4 of a conventional farm tractor.

The shank 17 and the associated aperture pieces 7 and 8 are especially constructed so as to provide for easy and convenient connection of the implement hitch frame 1 to the drawbar of the tractor. It will be seen from FIG. 1 that the shank 17 is considerably longer than the fore-and-aft distance between the shank-receiving apertured parts 7 and 8, and it will also be noted that the shank 17 includes two enlarged portions 27 and 28, best shown in FIG. 3, the enlarged portion 27 being apertured, as at 29, and the rearmost end portion of the shank 17 being apertured, as at 31. Each of these apertures 29 and 31, which is square in section, is adapted to receive a detachable draft pin 33. The apertures 15 and 16 in the cross members 7 and 8 are dimensioned to snugly receive the enlarge portions 27 and 28 of the shank 17 when the latter is in a rearward or rigidly interlocked position, but when the shank 17 is in a forward position, as shown in FIG. 1, the shank 17 has considerable looseness within the openings 15 and 16. However, the shank 17 is held connected with the draft frame 1 by virtue of the disposition of the pin 33 in the rearmost opening 31 in the shank 17.

Thus, the tractor carrying the clevis unit 18 may be backed into close proximity to, but not necessarily aligned accurately with, the hitch frame 1. However, the alignment must be sufficiently close so that the shank portion 17 of the clevis unit 18 may be inserted in the openings 15 and 16 in the draft frame cross pieces 7 and 8 far enough to insert the pin 33 in the rearmost opening 31. Then by backing the tractor the enlarged portions 27 and 28 are forced within and snugly fit the openings 15 and 16 in the cross pieces 7 and 8. To facilitate rigidly connecting the clevis member 18 with the implement hitch frame 1, the shank portions adjacent the enlarged sections 27 and 28 are tapered, as indicated at 27a and 28a, respectively. After the clevis member 18 has been forced rearwardly until the clevis 19 comes up against the front end of the implement frame, the draft pin 33 is inserted into the forward opening 29 in the shank section 17 just behind the cross piece 8, as shown in FIG. 2, and then the hitch clevis unit 18 is rigidly connected to the forward end of the implement hitch frame 1. Thus, the loose connection of the shank 17 and associated hitch frame, as illustrated in FIG. 1, accommodates some misalignment between the tractor and the implement without interfering with the final rigid connection of the shank member 145 with the implement hitch frame. As will be seen from FIG. 2, when the shank member 145 is rigid with the implement hitch frame, the forward portion of the latter is supported on the drawbar-carried clevis 23 but may swing vertically relative to the tractor about the transverse axis as defined by the pivot pin 21. The hitch frame 1 may swing laterally relative to the tractor by virtue of permissive lateral movement of the clevis 23 relative to the tractor drawbar 4.

While we have shown and described the preferred structure in which the principles of the present invention have been incorporated, it is to be understood that our invention is not to be limited to the particular means, shown and described above, but that, in fact, widely different means may be employed in the practice of the broader aspects of our invention.

What we claim, therefore, and desire to secure by Letters Patent is:

1. In an agricultural implement, a frame including a pair of bars, means interconnecting said bars including a pair of spaced apart apertured cross pieces, a hitch shank shiftably disposed in said apertured cross pieces and including an elongated member having enlarged and reduced sections spaced apart a distance corresponding to the distance between said cross pieces, whereby said shank may be positioned so that the enlarged sections are snugly disposed in said cross piece apertures or said reduced sections are loosely disposed in said cross piece apertures, and means insertable in selected openings in said shank for optionally holding said shank in either position.

2. In an agricultural implement, a frame including a pair of bars, means interconnecting said bars including a pair of spaced apart apertured cross pieces, the apertures thereof being generally circular and lying in fore and aft spaced apart vertical planes, a hitch shank shiftably disposed in said apertured cross pieces and including an elongated member having enlarged and reduced sections spaced apart a distance corresponding to the distance between said cross pieces, the diameter of each of said reduced sections being smaller than the diameter of the apertured portions of said cross pieces, said enlarged sections also being generally circular and the diameter of each of said enlarged sections being substantially equal to the diameter of the apertures in said cross pieces, said hitch shank being shiftable generally longitudinally in said apertured cross pieces, whereby said shank may be positioned so that the enlarged sections are snugly disposed in said cross piece apertures or said reduced sections are loosely disposed in said cross piece apertures, said shank being apertured at spaced points, and pin means insertable in either of said shank apertures for optionally holding said shank in either position.

3. The invention set forth in claim 2, further characterized by said shank having tapered portions adjacent the portions of enlarged cross section, whereby axial shifting of said shank in said cross pieces is facilitated.

4. In an agricultural implement, a frame including a pair of bars, means interconnecting said bars including a pair of spaced apart apertured cross pieces, a hitch shank shiftably disposed in said apertured cross pieces and including an elongated member having enlarged and reduced sections spaced apart a distance corresponding to the distance between said cross pieces, the diameter of each of said reduced sections being smaller than the diameter of the apertured portions of said cross pieces and the diameter of each of said enlarged sections being substantially equal to the diameter of the apertures in said cross pieces, said hitch shank being shiftable generally longitudinally in said apertured cross pieces, whereby said shank may be positioned so that the enlarged sections are snugly disposed in said cross piece apertures or said reduced sections are loosely disposed in said cross piece apertures, there being openings disposed in said shank spaced apart so that one opening is disposed directly in front of one of said cross pieces when the shank member is in one position relative to the cross pieces and the other opening is closely adjacent the other cross piece when the shank member is in its other position, and insert means cooperating with said shank openings to lock the shank in selected positions.

References Cited in the file of this patent

UNITED STATES PATENTS

| | | |
|---|---|---|
| 2,845,281 | Holder et al. | July 29, 1958 |
| 2,947,550 | Oddson | Aug. 2, 1960 |

FOREIGN PATENTS

| | | |
|---|---|---|
| K–20,184 | Germany | Oct. 11, 1956 |